United States Patent
Liu et al.

(10) Patent No.: US 12,468,957 B2
(45) Date of Patent: Nov. 11, 2025

(54) CONTEXT SIMILARITY DETECTOR FOR ARTIFICIAL INTELLIGENCE

(71) Applicant: Zoom Communications, Inc., San Jose, CA (US)

(72) Inventors: Qiyong Liu, Guangdong (CN); Yang Liu, Singapore (SG); Saisamarth Rajesh Phaye, Singapore (SG)

(73) Assignee: Zoom Communications, Inc., San Jose, CA (US)

( * ) Notice: Subject to any disclaimer, the term of this patent is extended or adjusted under 35 U.S.C. 154(b) by 960 days.

(21) Appl. No.: 17/587,503

(22) Filed: Jan. 28, 2022

(65) Prior Publication Data
US 2023/0222360 A1    Jul. 13, 2023

(30) Foreign Application Priority Data
Jan. 13, 2022   (CN) .......................... 202220088914.8

(51) Int. Cl.
*G06F 17/00* (2019.01)
*G06N 5/022* (2023.01)

(52) U.S. Cl.
CPC .................................. *G06N 5/022* (2013.01)

(58) Field of Classification Search
CPC ............................ G06N 5/022; G06N 20/00
See application file for complete search history.

(56) References Cited

U.S. PATENT DOCUMENTS

| | | | |
|---|---|---|---|
| 2016/0078368 A1* | 3/2016 | Kakhandiki | G06N 5/04 706/12 |
| 2021/0357679 A1* | 11/2021 | Bondugula | G06N 3/082 |
| 2022/0043836 A1* | 2/2022 | Upadhyay | G06N 20/00 |

OTHER PUBLICATIONS

Szu-Hao Huang, Shang-Hong Lai, and Shih-Hsien Tai. A learning-based contrarian trading strategy via a dual-classifier model. ACM Trans. Intell. Syst. Technol. 2, 3, Article 20, 20 pages. <https://doi.org/10.1145/1961189.1961192>, Apr. 2011.*

* cited by examiner

*Primary Examiner* — Greta L Robinson
(74) *Attorney, Agent, or Firm* — Young Basile Hanlon & MacFarlane, P.C.

(57) ABSTRACT

Artificial intelligence models are trained with training datasets of known input/output values. Test datasets are used to evaluate the trained artificial intelligence models. Context mismatch between the training dataset and the test dataset can slow down the development of artificial intelligence models. The described systems and methods can identify context similar datasets for the purpose of training and testing an artificial intelligence model. In one embodiment, a context similarity detector can ingest and combine a training dataset and a test dataset and generate a context similarity score for the two. If the score is above a threshold, the datasets are similar, and the relevant artificial intelligence model can be trained with one and tested with the other.

20 Claims, 10 Drawing Sheets

CONTEXT SIMILARITY DETECTOR FOR ARTIFICIAL INTELLIGENCE

FIELD

This application relates to the field of artificial intelligence and more particularly to the field of training and evaluating artificial intelligence models.

SUMMARY

The appended claims may serve as a summary of this application.

DETAILED DESCRIPTION OF THE DRAWINGS

Figure 1:
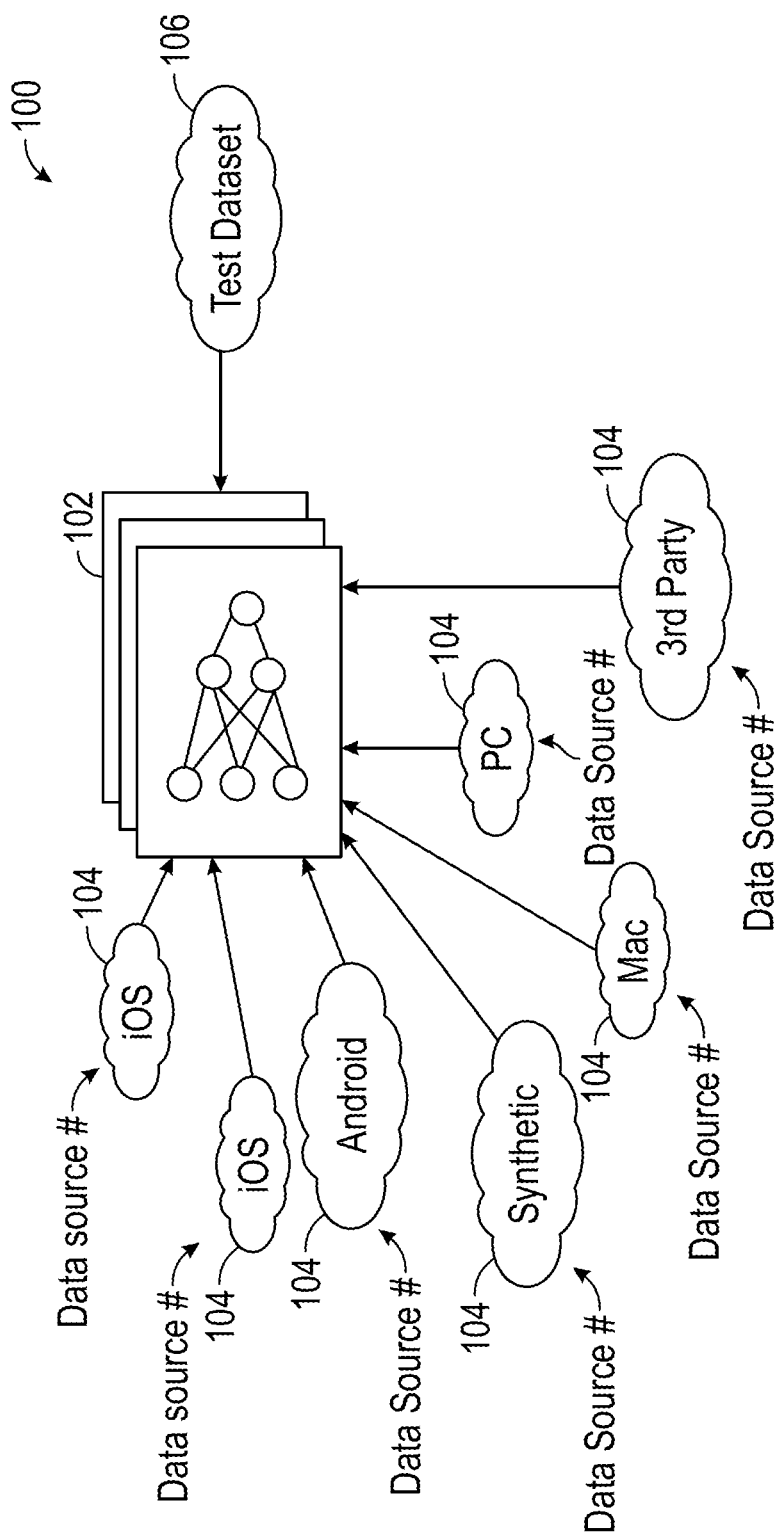
FIG. 1 illustrates an environment of training and testing of an artificial intelligence model.

Artificial intelligence (AI) network or models can be used to process a variety of data, including audio, video, and images and to provide insight, such as labeling and classifying the input data. Artificial intelligence networks, including deep learning models can be trained based on training datasets with known values. After training, AI models are evaluated using a test dataset. When AI and/or deep learning models are trained, it is helpful to use multiple datasets or data sources to better train a model. Usually, a problem in this context is the problem of data context mismatch, which can result from the model being trained on a specific type of data, while the model is being used or tested in a different context altogether. To solve this problem, a testing dataset can be compared with the available training datasets and a suitable combination of training datasets which can fit the testing environment can be identified. The AI model is then trained with the identified training dataset(s) and subsequently evaluated with the test dataset.

One approach for identifying a context-similar training dataset is to manually check the training samples from the different data sources and use qualitative judgement to determine which training dataset is similar to the test dataset. The manual approach can include finding similarity in patterns shared between datasets by visually inspecting qualitative plots, or by listening to audio samples (if the underlying AI model is directed to audio processing). However, the manual process can be difficult, inconsistent, or time-consuming in several environments, including for example, when trying to determine context-similar training and test datasets in audio environments, where training datasets can be from a variety of disparate data sources. For example, a video conferencing environment can have audio recordings from multiple sources, such as iOS/Android recordings, synthetic (idealistic) datasets, and in-house recordings, which can all contribute to or be used as training and/or test datasets. Since the choice of a training dataset can affect the AI model's performance metrics, such as efficiency and accuracy, the AI model developers have an interest in training and testing their AI models across the various disparate datasets and data sources. Consequently, the AI model development, using manual and subjective methods can become burdensome, inefficient, and inconsistent.

The described embodiments offer an alternative approach where a context similarity detector (CSD) can receive training datasets and a test dataset and determine a training dataset or a combination of training datasets that are context-similar to one another. The context similarity detector can receive or can extract a feature vector from the feature space of the combination of training and test datasets. The CSD can perform clustering on the combined training and test datasets based on the feature vector, placing similar samples in the same cluster. The clustering data, including the distribution of the samples in each cluster can be used to determine a measure of similarity of two or more training and test datasets. In some embodiments, the CSD can output a measure of similarity between the training and test datasets in the form of a context similarity score (CSS). As an example, in some embodiments, CSS can be a number between 0 to 1, with 0 indicating the training datasets and the test dataset are highly dissimilar and 1 indicating the datasets are highly similar. Persons of ordinary skill in the art can envision other scales for expressing similarity of datasets. In one aspect, when the clustering is able to distinguish between the samples from different data sources and cluster them into separate clusters, the datasets can be said to be dissimilar. On the other hand, when the clustering is unable to cluster the samples from two different data sources into distinct, separate clusters, the datasets from the different data sources are similar. For example, when the clustering fails to find differences in the datasets and each of the clusters have a near-equal number of samples from each data source, the datasets have a high similarity.

FIG. 1 illustrates an environment 100 of training and testing of an artificial intelligence (AI) model 102. Training datasets 104 can be obtained from a variety of data sources. For example, if the environment 100 is directed to developing an AI model for audio processing, the training datasets 104 may be audio recording from a variety of hardware devices, such as iOS® devices, Android® devices, Windows Personal Computers, Macintosh® devices and others. The audio recordings making up a training dataset 104 maybe synthetic and produced by a provider of audio/video conferencing environment for the purpose of training, testing and developing the AI model 102. A training dataset 104 may be from a third-party data source, such as a scientific or opensource AI training database. The training datasets 104 can also come from a variety of regions of the world, having audio sample recordings of various accents, languages, hardware devices and/or other varying characteristics. A test dataset 106 can be used to evaluate the AI model 102. The described embodiments can identify a combination of the training datasets 104 that yield a context-similar training dataset. The context-similar training dataset can be used to train the AI model 102. When the trained AI model 102 is trained with and evaluated with context-similar training and test datasets, the accuracy and efficiency of the AI model 102 is improved.

Figure 2:
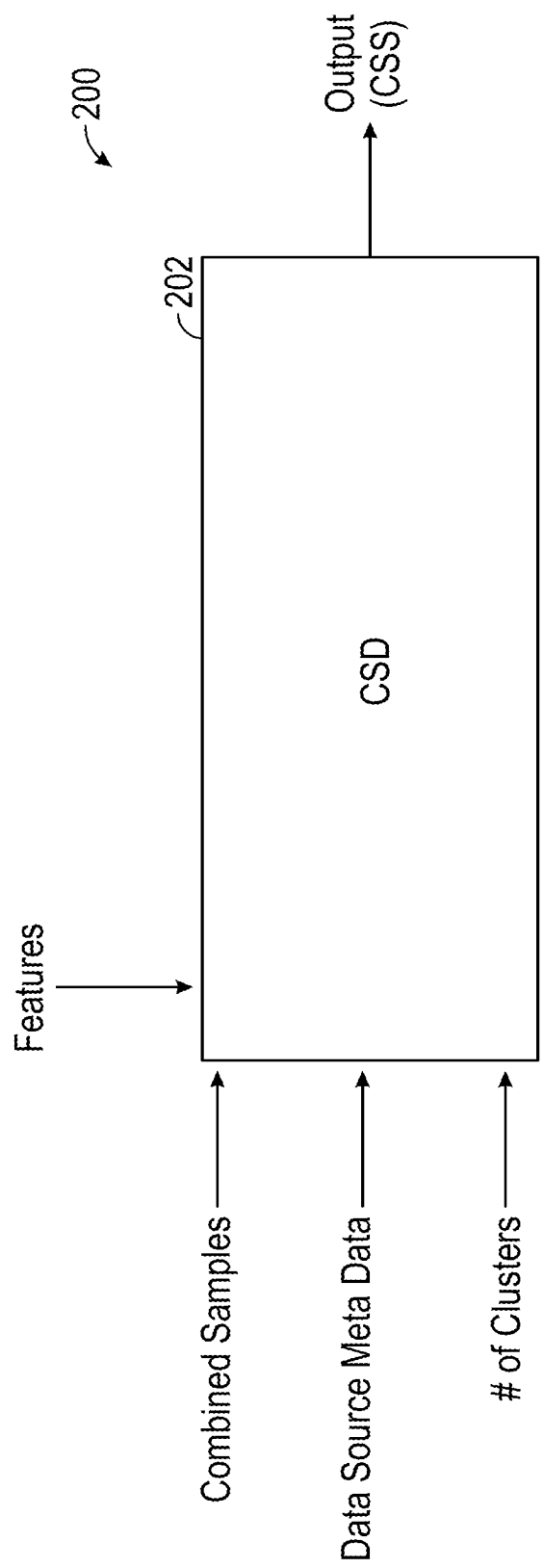
FIG. 2 illustrates an example context similarity detector which can be used to identify the level of similarity of a training dataset and a test dataset.

FIG. 2 illustrates a diagram 200 of an example context similarity detector (CSD) 202 which can be used to identify the level of similarity of a training dataset 104 (or a combination of training datasets 104) to a test dataset 106. In some embodiments, the CSD 202 can receive as input, a feature vector, combined samples from a training dataset 104 (or a combination of training datasets 104) and the test dataset 106, meta data relating to the source of each sample, and the number of clusters K, into which the CSD 202 can cluster the combined samples. In this description, the training dataset 104 may be referred to in the singular or in the plural, indicating that in practice, samples from two or more training datasets 104 can be combined or merged into a new training dataset 104 and input through the CSD 202 in order to determine the similarity of the newly generated training dataset 104 to the test dataset 106. The CSD 202 can generate and output a measure of similarity of the training dataset 104 and the test dataset 106 in a variety of formats. In one embodiment, The CSD 202 can output a context similarity score (CSS) as a number between 0 to 1, with 0 indicating the training dataset and the test dataset are highly dissimilar and 1 indicating the two datasets are highly similar.

Figure 3:
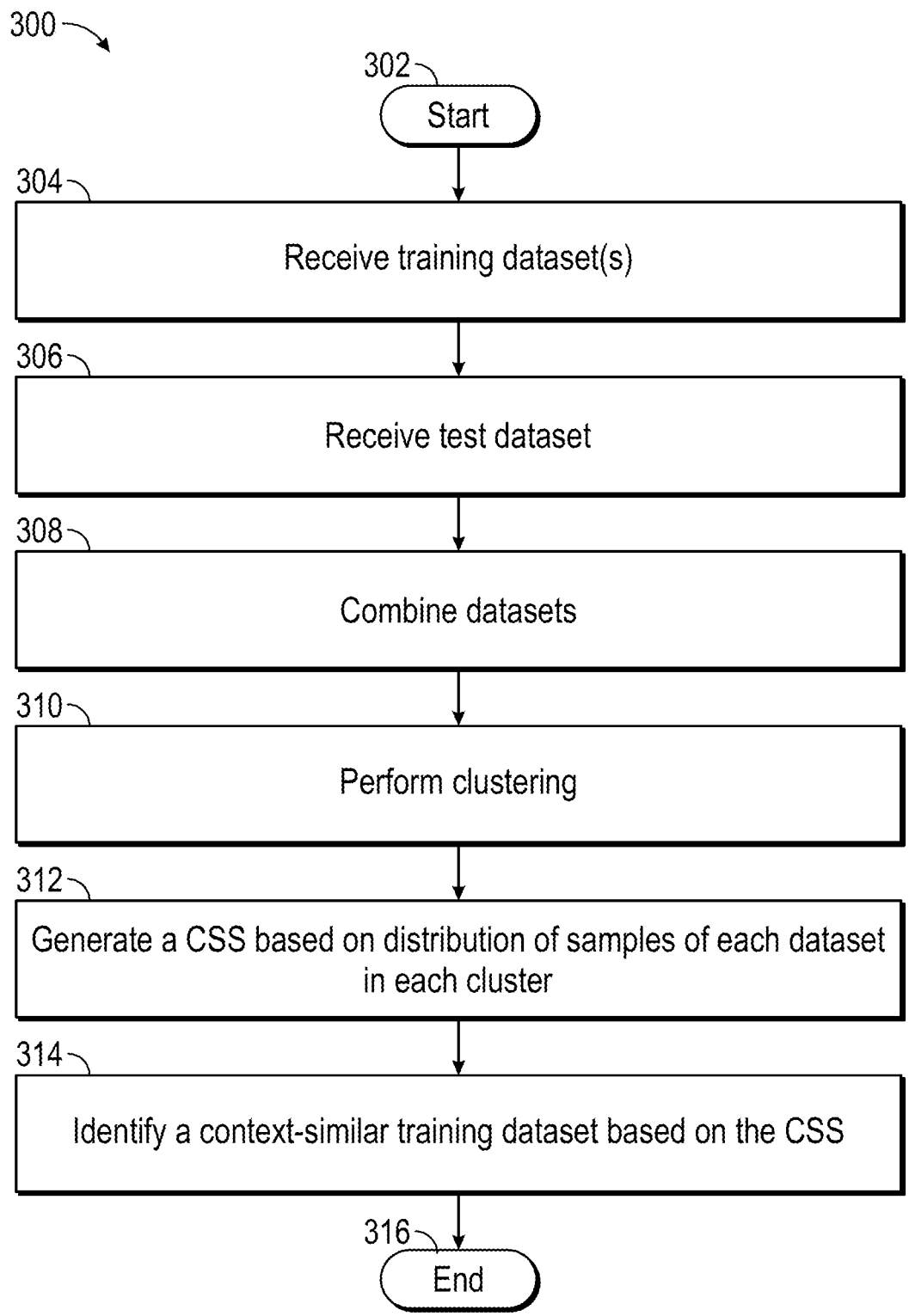
FIG. 3 illustrates a flowchart of a method of an example operation of the embodiment of FIG. 2.

FIG. 3 illustrates a flowchart of a method 300 of one example operation of the CSD 202. The method starts at step 302. At step 304, the CSD 202 can receive one or more training datasets 104 from a plurality of data sources. Alternatively, the CSD 202 can receive a single training dataset that may or may not have been generated from a single or a plurality of training datasets 104. At step 306, the CSD 202 can receive a test dataset 106. At step 308, the CSD 202 can combine the training dataset 104 and the test dataset 106. At step 310, the CSD 202 can perform clustering on the combined datasets, identifying clusters in the samples in the combined datasets. In some embodiments, the number of clusters K can be a constant provided automatically or manually to the CSD 202. The CSD 202 clusters the samples of the combined datasets into K clusters. In some embodiments, the clustering is based on a feature vector and/or a feature space. In the context of audio samples, the feature vector may include audio features such as bass, treble, speech, noise, frequency and other audio features. In the context of imaging, the features can relate to image features, such as color, density, luminosity, or more higher-level image features, depending on the application, for example, human face, animal face, eyes, cars, pedestrian, bicycle, trees, or any other imaging features depending on the application. In other fields, the feature vector and/or the feature space depends on the characteristics of interest to the AI developers in that particular field.

At step 312, the CSD 202 can generate a CSS based on distribution of samples of each dataset in each cluster. In one respect, the CSS indicates a similarity of the distribution of samples in a training dataset to the distribution of samples in the test dataset. In other words, if the distribution of samples from each dataset in each cluster is nearly the same, the datasets are similar. As an example, a training dataset 104 has 10,000 samples and a test dataset 106 has 100 samples.

As an example, the combined samples can be clustered into two clusters C1 and C2, such that C1 has 9000 samples from the training dataset, C2 has 1000 samples from the training dataset, C1 has 90 samples from the test dataset, and C2 has 10 samples from the test dataset. In this example, the distribution of the datasets in each cluster is identical. The training dataset has 90% of its samples in C1 and the test dataset also has 90% of its samples in C1. The training dataset has 10% of its samples in C2 and the test dataset also has 10% of its samples in C2. Consequently, the training and the test dataset in this example are highly context-similar. Their samples are, identically or near-identically, distributed in two clusters. At step 314, a training dataset having a CSS above a threshold is identified as a context-similar dataset and outputted. The method ends at step 316. The AI model 102 can be trained with the context-similar dataset and evaluated with the test dataset 106.

In some embodiments, the clustering is performed based on a feature vector that is extracted from the feature space of the training datasets 104 and/or the test dataset 106. In some embodiments, deep learning models trained to extract features in the feature space of the training datasets 104 can be used to extract features and generate the feature vector for clustering. Features in the audio context can include various properties of an audio signal, including amount of bass, treble, volume, frequency, noise level, speech signal, and other audio features. In the image and video context, the features may relate to imaging context. The CSD 202 can include components to extract the feature vector or may receive the feature vector as an input. In some embodiments, the features are extracted in the same way and have the same normalization, so that each source provides inputs in the same feature space. The training datasets and the test dataset can have features of any number of dimensions, including high dimensional features.

Clustering

Figure 4:
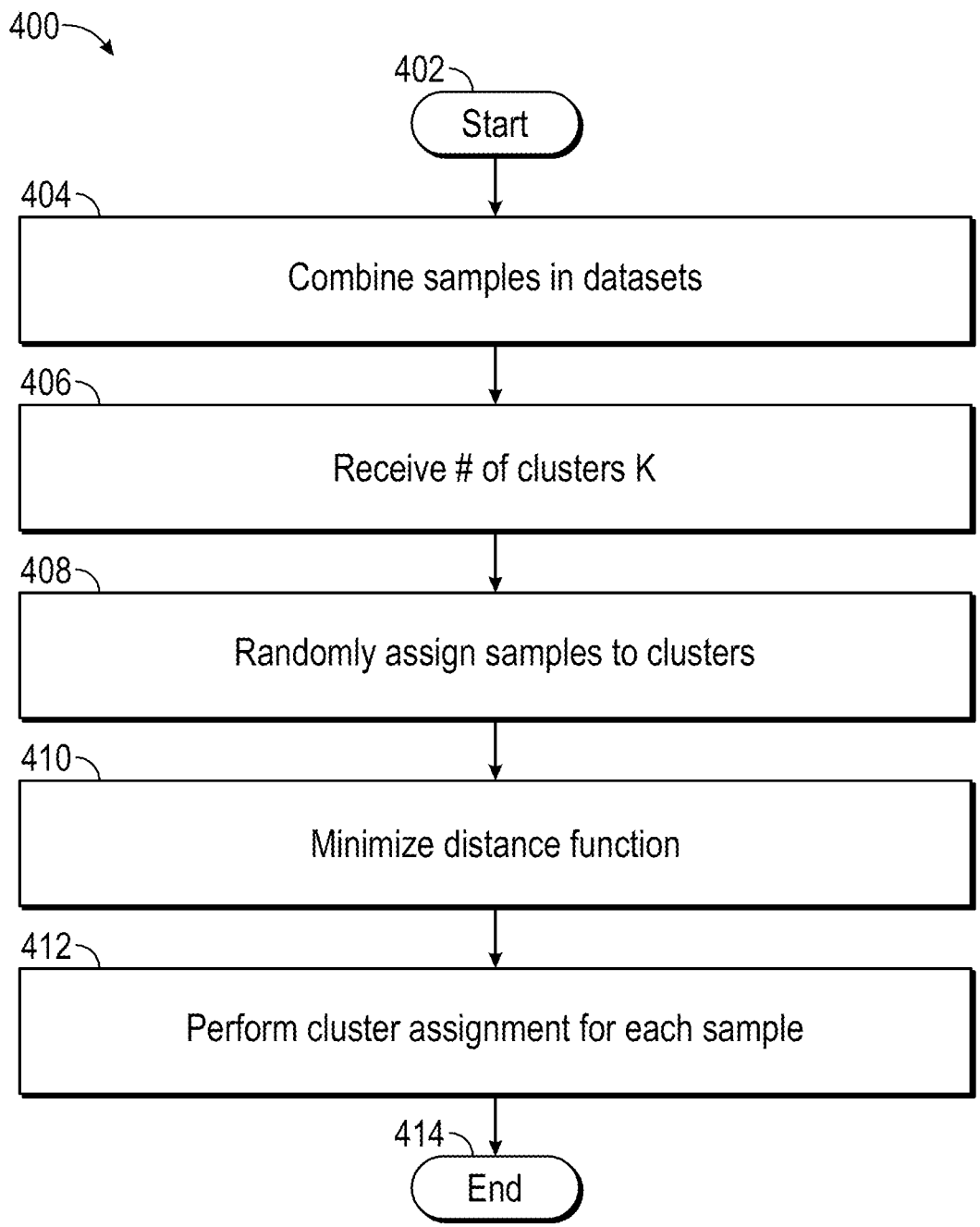
FIG. 4 illustrates an example flowchart of a method of clustering according to an embodiment.

FIG. 4 illustrates an example flowchart of a method 400 of clustering according to an embodiment. The method starts at step 402. At step 404, the samples from a training dataset and a test dataset are combined. For example, the combined datasets can have samples $X_1, X_2, X_3, \ldots X_N$, where N is the total number of samples in the combined datasets. At step 406, a number of clusters K is received. K can be manually inputted or determined via a separate algorithm. At step 408, samples are randomly assigned to clusters. At step 410, a distance function J is minimized. Minimizing the distance function J includes minimizing the distance between the samples and the cluster centers. The cluster centers are randomly assigned in step 408. Minimizing the distance function in step 410 further includes iteratively moving the center of the clusters until the cluster centers yielding the minimum distance to the samples are found. The distance function J can be defined based on the dimensions of the samples. In some embodiments, Euclidean distance can be used. For example, for two-dimensional sample data, having dimensions x and y for each sample, the distance can be the square root of $(x^2+y^2)$, for three-dimensional sample data, having dimensions x, y and z, the distance can be the square root of $(x^2+y^2+z^2)$ and so forth. Other distance formulas can also be used. An example distance function J is expressed in Equation (1).

$$J = \Sigma\Sigma \|X_i - C_K\| \qquad \text{Equation (1)}$$

$\forall i \forall k$ where K=0 to K−1 and i=0 to N−1

After minimizing the distance function in step 410, the method moves to step 412, where each sample in the combined datasets is assigned to a cluster, or identified to be in a cluster and tagged with meta data indicating that the sample belongs to a cluster. Cluster assignment can include constructing a cluster matrix M, having S rows and K columns, where S is the number of combined datasets (which can in turn correspond to the number of data sources from which the datasets were derived) and K is the number of clusters. In the cluster matrix M, each cell $M_{ij}$ is the number of samples from the "i"th source found to be in the "j"th cluster. The method 400 ends at step 414.

The clustering technique described above is an example of unsupervised clustering. However, the described embodiments are not limited to the clustering methods described herein. Any clustering method can be used to identify clusters in the combined dataset.

Normalization

In some applications, the number of samples in some datasets can be much larger than the samples from the other datasets in the combined datasets. For example, the number of samples in a training dataset 104 can be in the order of thousands or hundreds of thousands, while the number of samples in a test dataset can be in the order of hundreds or even fewer. In this scenario, the CSS may be unduly influenced by the dataset having the larger number of samples. A normalization step can remove the bias introduced by the larger dataset. For example, the cluster matrix, M, can be normalized by dividing each cell $M_{ij}$ by the number of samples in the dataset to which the cell corresponds. Normalization can be expressed by Equation (2).

$$\text{Normalized\_M}_{ij} = \frac{M_{ij}}{\Sigma\ M_{ij} \forall\ j \in R} \quad \text{Equation (2)}$$

Where R is the Space Defining the Matrix M

Source Score for Each Data Source and/or Dataset

In some embodiments, the CSS is in part based on a source score for each training dataset in the combined dataset. Source score is a measure of the presence, occupancy, distribution, or ratio of a dataset from a data source in the combined dataset. In some embodiments, the source score of a dataset is generated by normalizing the cluster matrix, using the normalized matrix to derive normalized occupancies of each cluster by each dataset, weighting the normalized occupancies based on the size of the clusters, and multiplying the normalized and weighted occupancies. The weighting is performed to make the source score more robust. The source score is influenced by the size of the clusters to account for the more critical occupancies. For example, if a first dataset from a first data source has an 80% occupancy of a first cluster and the size of the first cluster is about 90% of the combined samples, and a second dataset from a second data source has a 20% occupancy of the first cluster, and 90% occupancy of a second cluster, but the size of the second cluster is only 10% of the combined samples, the first data source related to the first dataset in the first cluster has a higher source score.

There are various methods to weight the normalized occupancies and account for the size of clusters. In some embodiments, the normalized occupancies can be raised to the power of a ratio of the size of a cluster, relative to the other clusters. When normalized sizes are used, weighting can include dividing the normalized number of samples in a cluster by the normalized total number of samples in all clusters. The weighted normalized occupancies can be multiplied to generate the source score for a dataset or a data source corresponding to the dataset. In other words, in some embodiments, the source score for a dataset or a data source can be a product of weighted normalized occupancies of each cluster by the dataset corresponding to that data source.

As an example, the normalized number of samples in each cluster "j" can be generated based on Equation (3).

$$\text{Normalized\_}Cj = \Sigma\text{Normalized\_}Mij \forall i \in R \quad \text{Equation (3)}$$

Where R is the space defining the matrix M

A normalized number of samples in all clusters can be generated based on Equation (4).

$$\text{Normalized\_}Ctotal = \Sigma\Sigma\text{Normalized\_}Mij \forall i \forall j \in R \quad \text{Equation (4)}$$

Where R is the Space Defining the Matrix M

Given the normalized number of samples in each cluster, normalized_Cj and the normalized number of samples in all clusters, normalized_Ctotal, a source score $S_i$ for a data source "i" can be generated based on Equation (5).

$$S_i = \prod \left(\frac{\text{Normalized\_Mij}}{\text{Normalized\_Cj}}\right)^{\left(\frac{Normalized\_Cj}{Normalized\_Ctotal}\right)} \forall\ j \quad \text{Equation (5)}$$

The described weighting technique illustrated above is provided as an example only. Persons of ordinary skill in the art can envision other weighting techniques to account for the size of each cluster when generating source scores. If the technique above is used, the source scores $S_i$ is a number between 0 to 1. Given the individual source scores $S_i$, the CSS can be generated by multiplying the weighted normalized occupancies, raising the product to the power of one over the number of sources and multiplying the result by the number of sources. This method of arriving at CSS based on individual source scores $S_i$ is expressed in Equation (6).

$$CSS = \left(\prod S_i \forall\ i\right)^{\left(\frac{1}{S}\right)} \times S \quad \text{Equation (6)}$$

Where $S_i$ is the Individual Source Score, and S is the Number of Data Sources

Figure 5:
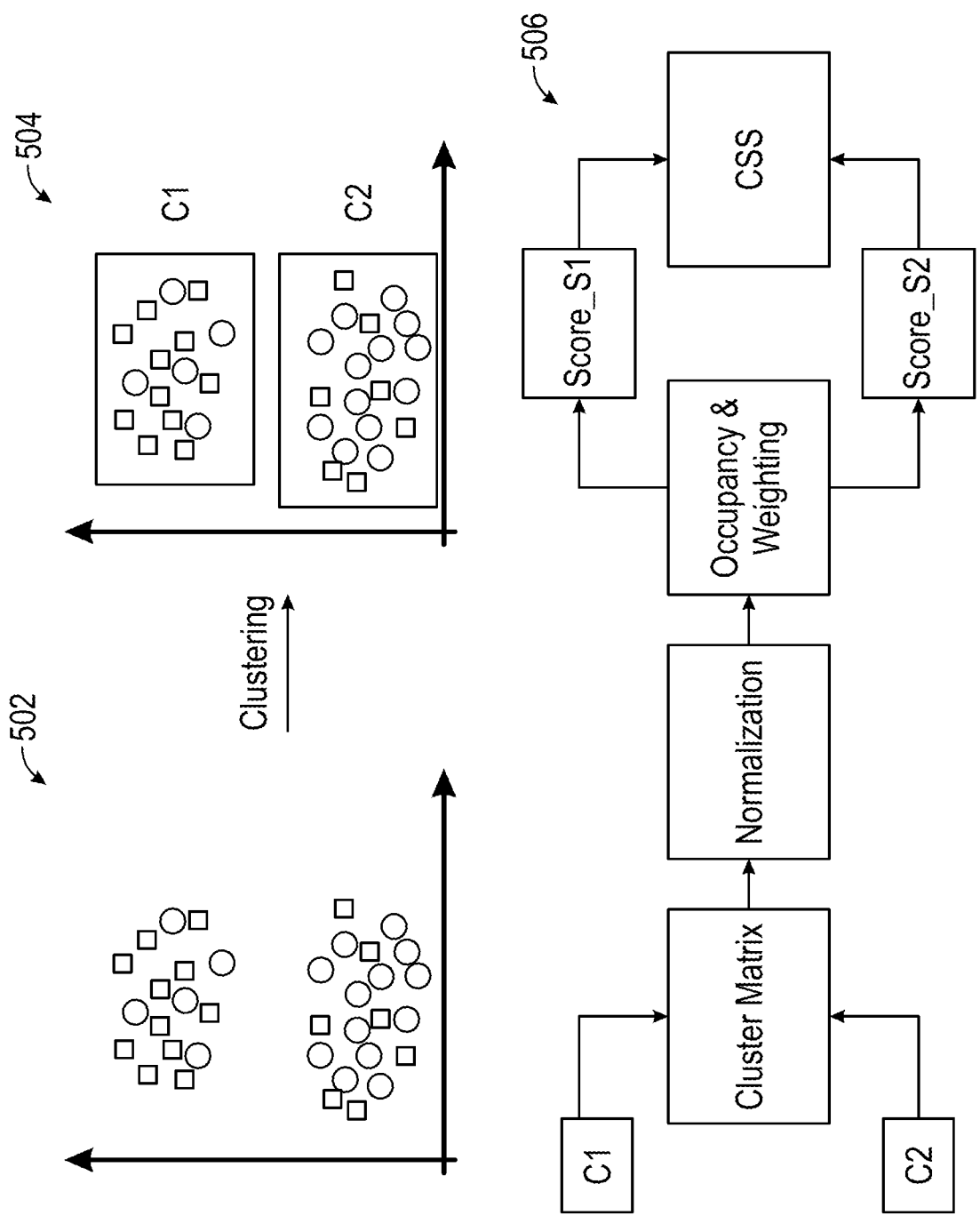
FIG. 5 illustrates a diagram of two datasets from two data sources and a diagram of an example operation of the embodiment of FIG. 2.

FIG. 5 illustrates a diagram of two datasets from two data sources and a diagram of an example operation of the CSD. The CSD 202 can determine a CSS for these two datasets. The circle dataset can be a training dataset from the data source or source S1. The square dataset can be a test dataset from the data source or source S2. The size of the circle dataset corresponding to the number of samples in the circle dataset is 18. The size of the square dataset, corresponding to the number of samples in the square dataset is also 18 in this example. For ease of illustration and visualization, the datasets in this example are chosen to be two-dimensional, so they can be plotted on paper and visualized. Consequently, the x and y axis can be any two selected characteristics of the samples in the datasets, plotted against one another. In practice, the training and test datasets have more than two dimensions based on the attributes, characteristics and features of the samples in the datasets. The circle and square datasets are plotted in a two-dimensional graph 502. Plotting is only used here to illustrate the clusters to a human reader of this description; otherwise, the computer system executing the CSD 202 does not necessarily have to plot the datasets. The graph 502 visually presents two distinct clusters to a human observer, but the CSD 202 performs clustering, as described above, for example in relation to the embodiment of FIG. 4 to cluster the samples in the combined dataset into two clusters, C1 and C2. The clustering is illustrated in graph 504 by two rectangles C1 and C2 enclosing each cluster. However, this is shown for the benefit of the reader of this description, the CSD 202 may track the final cluster data in a meta data file, tracking the cluster to which a sample belongs.

For the illustrated example, cluster C1 includes 5 samples from the circle dataset and 11 samples from the square dataset. Cluster 2 includes 13 samples from the circle dataset and 7 samples from the square dataset. The diagram 506 can illustrate how the CSD 202 uses the clustering data to arrive at a CSS. The CSD 202 can build a cluster matrix Mij based on clustering data of clusters C1 and C2, as shown in Equation (7) below.

$$Mij = \begin{bmatrix} S1C1 & S1C2 \\ S2C1 & S2C2 \end{bmatrix} \quad \text{Equation (7)}$$

In the cluster matrix Mij, SiCj indicates, the number of samples from source "i" in cluster "j". Consequently, the cluster matrix Mij for the example shown in FIG. 5 is as expressed below in Equation (8).

$$Mij = \begin{bmatrix} 5 & 13 \\ 11 & 7 \end{bmatrix} \quad \text{Equation (8)}$$

As described earlier, in some applications, the size of a dataset from one source can be disproportionately larger than the other datasets in the combined dataset. If individual source scores or CSS are derived using raw number of samples, they can be unduly influenced by the larger dataset. In those instances, a normalization can remove the bias introduced by the size of the datasets. In some embodiments, the normalization can be performed by dividing each cell SiCj of the cluster matrix Mij with the number of samples in the source "i". For example, the normalized cluster matrix, normalized_Mij, for the example shown in FIG. 5 can be generated according to Equation (9).

$$\text{Normalized } Mij = \begin{bmatrix} \frac{S1C1}{S1} & \frac{S1C2}{S1} \\ \frac{S2C1}{S2} & \frac{S2C2}{S2} \end{bmatrix} = \begin{bmatrix} \frac{5}{18} & \frac{13}{18} \\ \frac{11}{18} & \frac{7}{18} \end{bmatrix} \quad \text{Equation (9)}$$

$$\text{Normalized } Mij \cong \begin{bmatrix} 0.28 & 0.72 \\ 09.61 & 0.39 \end{bmatrix}$$

In the Example of FIG. 5, the size of the datasets S1 and S2 are both 18. As a result, in normalization, each cell is divided by 18. However, if the sizes of the datasets S1 and S2 were different, the cells would be divided by the size of the source corresponding to the cell. Another way of expressing the normalization in this method is that each row "i" of the cluster matrix Mij is divided by the size of the source "i".

The normalized cluster matrix, normalized_Mij, can be used to generate source scores Score_S1 and Score_S2 for each dataset, where the source scores are generated based on a product of weighted normalized occupancies of each cluster "j" by a dataset corresponding to source "i". Occupancy is a distribution ratio of samples of a dataset in a cluster. Normalized occupancies can be generated by dividing the normalized number of samples of a dataset in a cluster by the normalized size of that cluster. Weighting can be performed by a variety of methods to account for the size of a cluster. In some embodiments, the weighting can be performed by raising the normalized occupancies to the power of a ratio of the size of a cluster relative to the other clusters. To arrive at the source scores, the size of a normalized cluster Cj can be determined based on Equation (3), the normalized number of samples in all clusters can be generated based on Equation (4) and the individual source scores can be generated based on Equation (5).

For the example shown in FIG. 5, the normalized occupancy of source S1 in cluster C1 is 0.28/(0.28+0.61). The numerator is the normalized number of samples of S1 in cluster C1. The denominator is the normalized size of cluster C1. The normalized occupancy of source S1 in cluster C2 is 0.72/(0.72+0.39). The numerator is the normalized number of samples of S1 in cluster C2. The denominator is the normalized size of cluster C2. The normalized occupancy of source S2 in cluster C1 is 0.61/(0.28+0.61). The numerator is the normalized number of samples of S2 in cluster C1. The denominator is the normalized size of cluster C1. The normalized occupancy of source S2 in cluster C2 is 0.39/(0.72+0.39). The numerator is the normalized number of samples of S2 in cluster C2. The denominator is the normalized size of cluster C2. The normalized size of cluster C1 is (0.28+0.61) or 0.89. The normalized size of cluster C2 is (0.72+0.39) or 1.11. The normalized size of all clusters is 0.89+1.11 or 2. The normalized size of clusters, normalized_Ctotal is equal to the number of sources, which in this example is two.

As an example of weighting, each normalized occupancy is raised to the power of a ratio of a normalized size of a cluster over a normalized size of all samples in all clusters. The power factor in Equations (10)-(13) below performs the weighting function. The product of the weighted normalized occupancies generates the individual source scores. Equations (10)-(13) are based on applying Equation (5) to the example shown in FIG. 5.

$$\text{Score } S1 = \left(\frac{\text{Normalized } S1C1}{\text{Normalized } C1}\right)^{\left(\frac{\text{Normalized } C1}{\text{Normalized } Ctotal}\right)} \times \quad \text{Equation (10)}$$

$$\left(\frac{\text{Normalized } S1C2}{\text{Normalized } C2}\right)^{\left(\frac{\text{Normalized } C2}{\text{Normalized } Ctotal}\right)}$$

$$\text{Score } S1 = \left(\frac{0.28}{0.89}\right)^{\left(\frac{0.89}{2}\right)} \times \left(\frac{0.72}{1.11}\right)^{\left(\frac{1.11}{2}\right)} \cong 0.470 \quad \text{Equation (11)}$$

$$\text{Score } S2 = \left(\frac{\text{Normalized } S2C1}{\text{Normalized } C1}\right)^{\left(\frac{\text{Normalized } C1}{\text{Normalized } Ctotal}\right)} \times \quad \text{Equation (12)}$$

$$\left(\frac{\text{Normalized } S2C2}{\text{Normalized } C2}\right)^{\left(\frac{\text{Normalized } C2}{\text{Normalized } Ctotal}\right)}$$

$$\text{Score } S2 = \left(\frac{0.61}{0.89}\right)^{\left(\frac{0.89}{2}\right)} \times \left(\frac{0.39}{1.11}\right)^{\left(\frac{1.11}{2}\right)} \cong 0.473 \quad \text{Equation (13)}$$

From the individual source scores, the CSS can be generated by a variety of methods. In some embodiments, the CSS is generated by raising the product of individual source scores to the power of one over the number of sources and multiplying the result by the number of sources. Equations (14) and (15) illustrate generating CSS for the example shown in FIG. 5. Equations (14) and (15) are based on applying Equation (6) to the example shown in FIG. 5.

$$CSS = (ScoreS1 \times ScoreS2)^{\left(\frac{1}{S}\right)} \times S \qquad \text{Equation (14)}$$

Where S is the Number of Sources.

$$CSS=(0.470\times0.473)^{(1/2)}\times2\cong0.943 \qquad \text{Equation (15)}$$

CSS figures near "1" indicate the datasets are highly similar. An artificial intelligence model can be trained and evaluated with context-similar datasets efficiently. In some embodiments, the CSS can be compared against a selected threshold. Dataset combinations yielding CSS above the threshold can be identified and used to train and evaluate artificial intelligence models. For example, in some embodiments, CSS between 0.8 to 1 can be used to identify context-similar datasets. Persons of ordinary skill in the art can use other ranges for the threshold.

Figure 6:
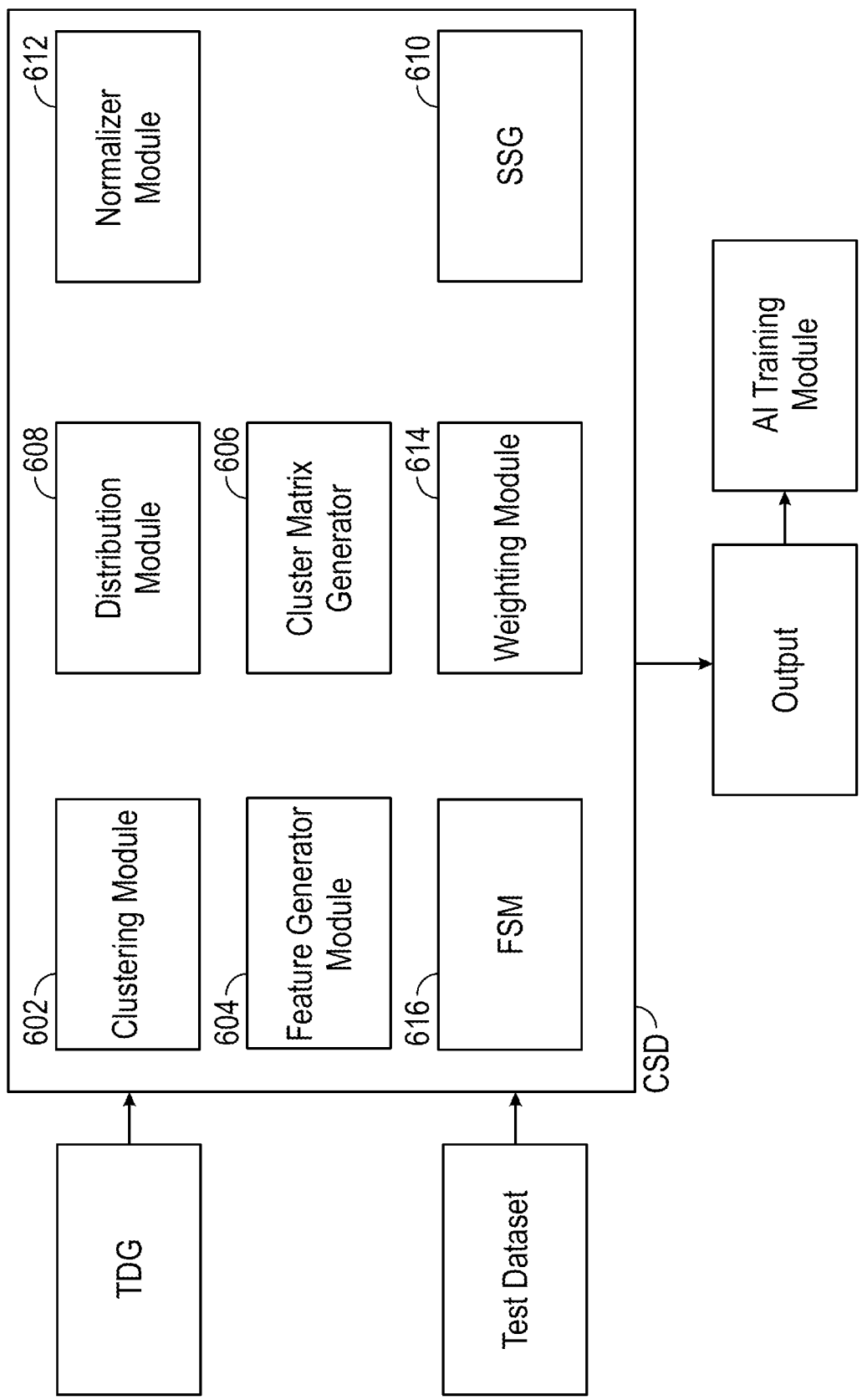
FIG. 6 illustrates an example context similarity detector, along with input/output components.

FIG. 6 illustrates an example CSD 202 along with input/output components. In some embodiments, a training dataset generator TDG can merge training datasets 104 from sources 106 to generate new training datasets to input to the CSD 202. Alternatively, TDG may feed training datasets 104 into the CSD 202, unchanged. A test dataset module can generate or otherwise receive and input a test dataset 106 into the CSD 202. The CSD 202 can identify one or more training datasets 104 that are context-similar to the test dataset 106 and output the context-similar training dataset(s) to an AI-training module. The AI training module can use the context-similar training dataset(s) to train an AI model. The test dataset can then be used to test and evaluate the performance of the AI model. The AI model could be an AI model in any practical field of technology, including for example, audio and video processing in an online video conferencing application, imaging technology, augmented reality, autonomous driving, and other fields.

The CSD 202 can combine the training and test dataset and generate a combined dataset. The CSD 202 can include a clustering module 602. The clustering module 602 can execute a variety of clustering algorithms, including those described above in relation to the embodiment of FIG. 4. However, other clustering algorithms can also be used, the CSD 202 can perform its functionality regardless of which clustering algorithm is used. In some embodiments, the CSD 202 can include a feature generator module 604, which can extract a feature vector from the training, test, or combined datasets for the purpose of clustering. The feature generator module 604, in some embodiments can be implemented with deep learning networks or other AI networks trained to extract features in the environment of the received training and test datasets. For example, the feature generator module 604 can be a deep learning model trained for extracting audio features, when the environment of the training and test datasets is audio processing. The feature generator module 604 can input a feature vector to the clustering module 602, based on which clustering can be performed. In other words, all, or a selection of, features of samples in the datasets can be used as input to the clustering module 602, based on which the clustering module 602 finds clusters in the combined datasets, keeping similar samples in the same cluster. In some embodiments, the clustering module 602 can receive the number of clusters K as an input.

The CSD 202 can include a cluster matrix generator 606, which can construct a matrix of sizes of the various datasets in the clusters, based on building cluster matrix M, as discussed above. Examples of cluster matrix M, constructed with cluster matrix generator 606, are expressed in Equations (7) and (8) above.

The CSD 202 can include a distribution module 608, which can obtain various distribution measurements of the samples in each dataset, in each cluster and/or in the overall combined dataset. In some embodiments, the distribution module 608 can be configured to generate occupancies of a cluster by a dataset. The CSD 202 can generate a context similarity score (CS S), based on distribution of samples of each dataset in each cluster. The CSS can indicate whether the distributions of samples from different datasets in each cluster are similar. In some embodiments, the CSD 202 can utilize a source score generator (SSG) 610. The SSG 610 can in turn use a normalizer module 612 and a weighting module 614 to generate individual similarity scores for each dataset. The normalizer module 612 can generate a normalized cluster matrix by diving each cell Mij of the cluster matrix by the number of samples in source "i". Source "i" in this context refers to a dataset "i" or, interchangeably, to a data source "i" from which the training or test dataset "i" originated. The SSG 610 can use the normalized matrix to generate individual source scores for each source "i", as described above in relation to the embodiment of FIG. 5. The CSD 202 can include a final score module (FSM) 616, which can generate a CSS based on the individual source scores. In some embodiments, the FSM 616 receives the individual source scores, the number of sources and generates the CSS using Equation (6). The illustrated components of FIG. 6 are intended as examples. Persons of ordinary skill in the art can envision using fewer or more components by combining two or more components or separating the components into more parts.

The described systems and techniques can be fast and efficient when operating on large datasets and can have a variety of applications. For example, the described systems and techniques can be useful in domains where data collection for AI training may be difficult, costly or otherwise burdensome. In this scenario, existing training datasets can be merged in multiple ways and efficiently run through the CSD 202 to determine the context similarity of the merged versions with a particular test dataset. Without the benefit of the described embodiments, time consuming qualitative analysis may have to be performed, in order to identify context-similar training and test datasets. Furthermore, by obviating or reducing the need for qualitative and subjective analysis, the described embodiments increase consistency and objectivity among various projects of identifying context-similar AI training and test datasets.

Figure 7:
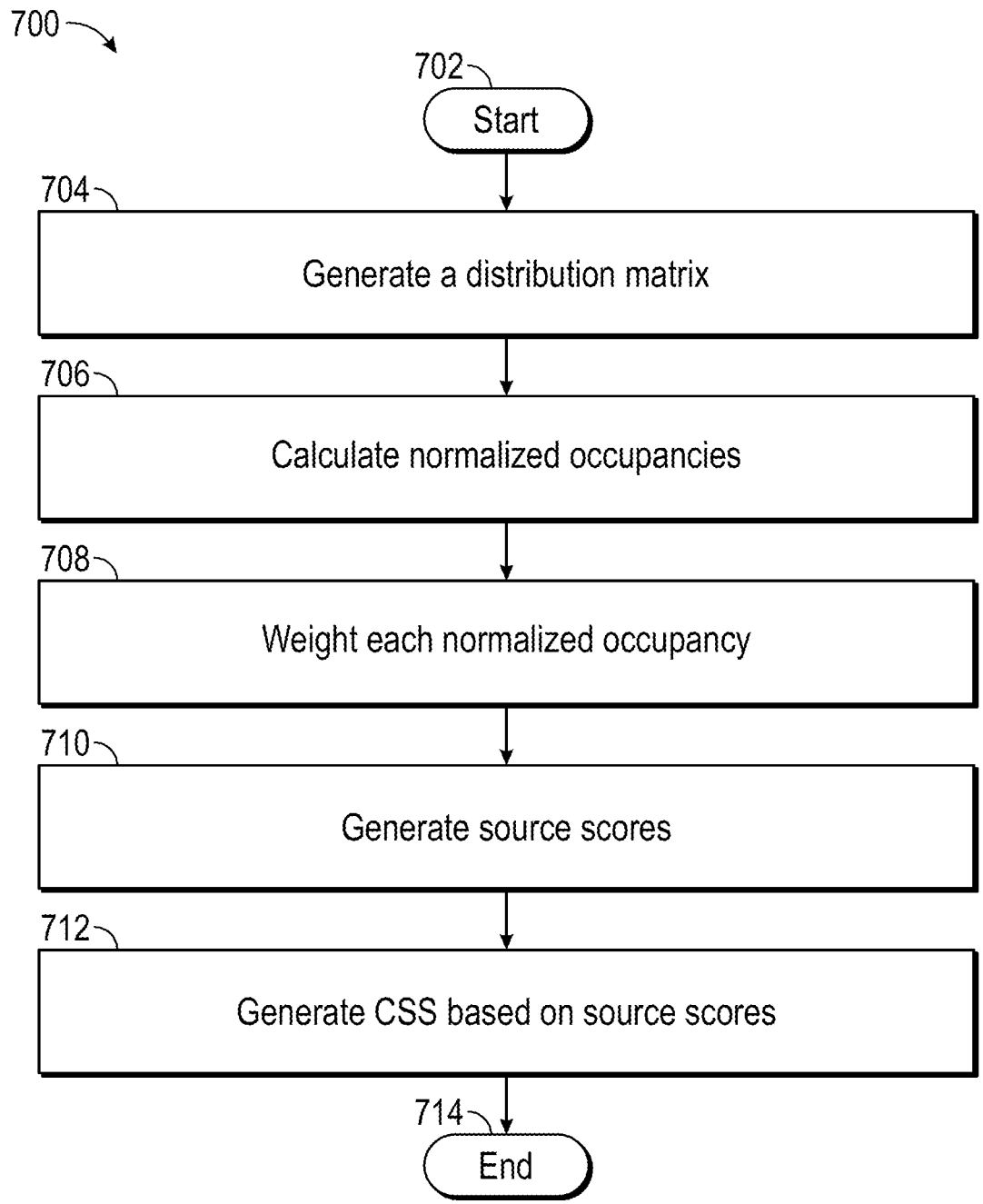
FIG. 7 illustrates an example method of generating a context similarity score based on generating two or more source scores.

FIG. 7 illustrates an example method 700 of generating the CSS based on generating two or more source scores. The method starts at step 702. At step 704, a matrix is generated based on distribution ratios of each source in each cluster. At step 706, the normalized occupancies of the clusters by a dataset is calculated. At step 708, each normalized occupancy is weighted by a ratio of the size of a cluster relative to the size of total clusters. In some embodiments, the weighting includes raising the occupancies to the power of this ratio. In some embodiments, the ratio is determined based on normalized size of the clusters. At step 710, the weighted normalized occupancies are multiplied together to generate a source score for each dataset. At step 712, the CSS is generated by multiplying the source scores, raising the product to the power of one over the number of the datasets and multiplying the results by the number of the datasets. The method ends at step 714.

Figure 8:
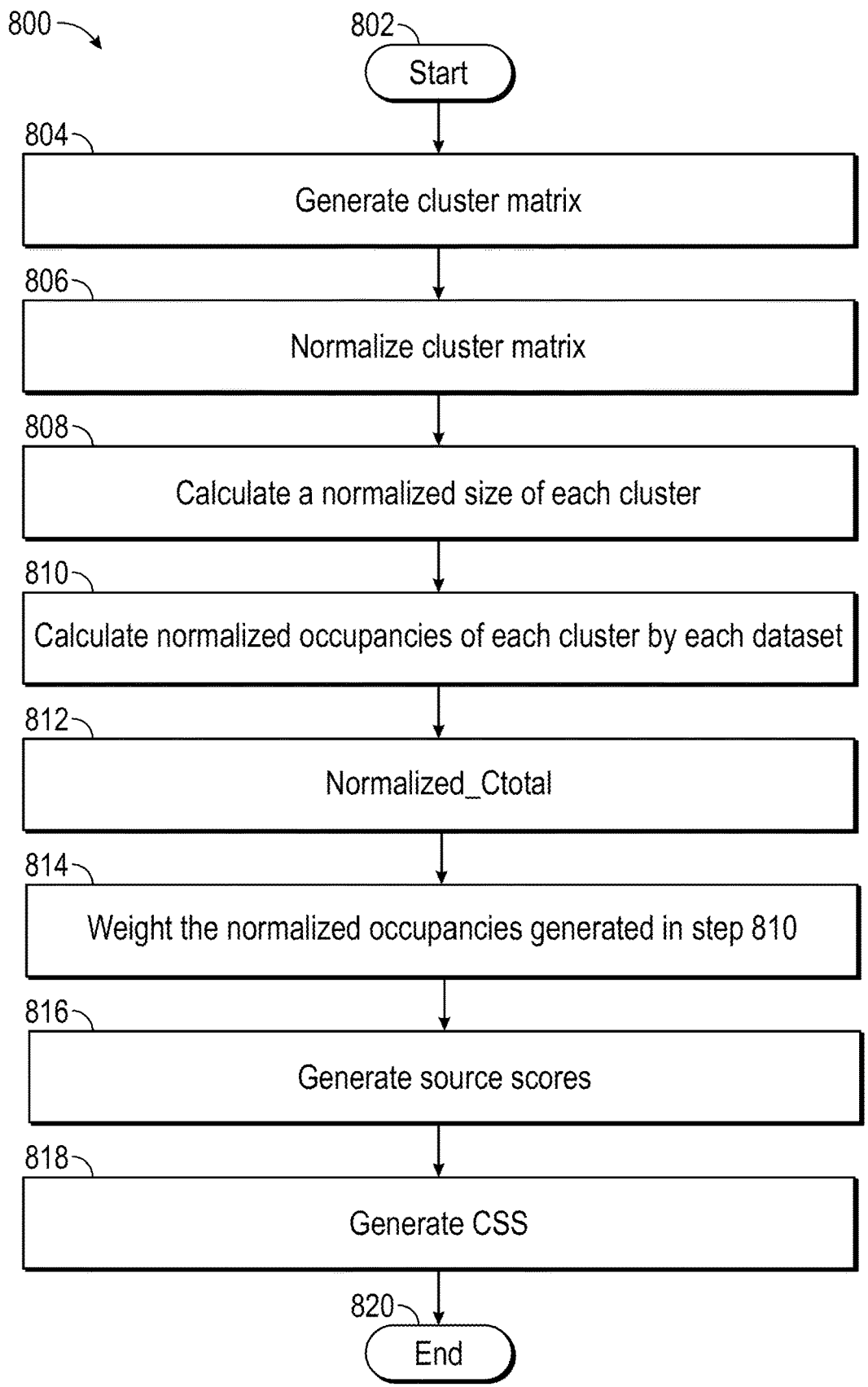
FIG. 8 also illustrates an example of a method of generating a context similarity score based on generating two or more source scores.

FIG. 8 illustrates an example of a method 800 of generating the CSS based on generating two or more source scores from the output of the clustering module 602. The method starts at step 802. At step 804, a cluster matrix M is generated, where each cell Mij indicates the number of samples of dataset "i" in cluster "j". At step 806, a normalized cluster matrix is generated by dividing each cell Mij by the number of samples in the dataset or source "i". At step 808, a normalized number of samples in each cluster "j" is calculated by summing column values of the normalized cluster matrix corresponding to cluster "j". At step 810, a normalized occupancy of a cluster "j" by a source or dataset "i" is calculated by dividing each cell of the normalized cluster matrix by the normalized number of samples in each cluster "j" calculated in step 808. At step 812, a normalized number of samples in all clusters, normalized_Ctotal is generated by summing the normalized number of samples in each cluster "j". At step 814, the normalized occupancies generated in step 810 are weighted by raising each normalized occupancy to the power of a ratio of the normalized number of samples in a cluster "j" over the normalized_Ctotal. At step 816, a source score for a dataset "i" is generated by multiplying the weighted normalized occupancies. At step 818, the CSS is generated by multiplying the source scores for all datasets and raising the product to the power of one over the number of datasets and multiplying the result by the number of datasets. The method ends at step 820.

Figure 9:
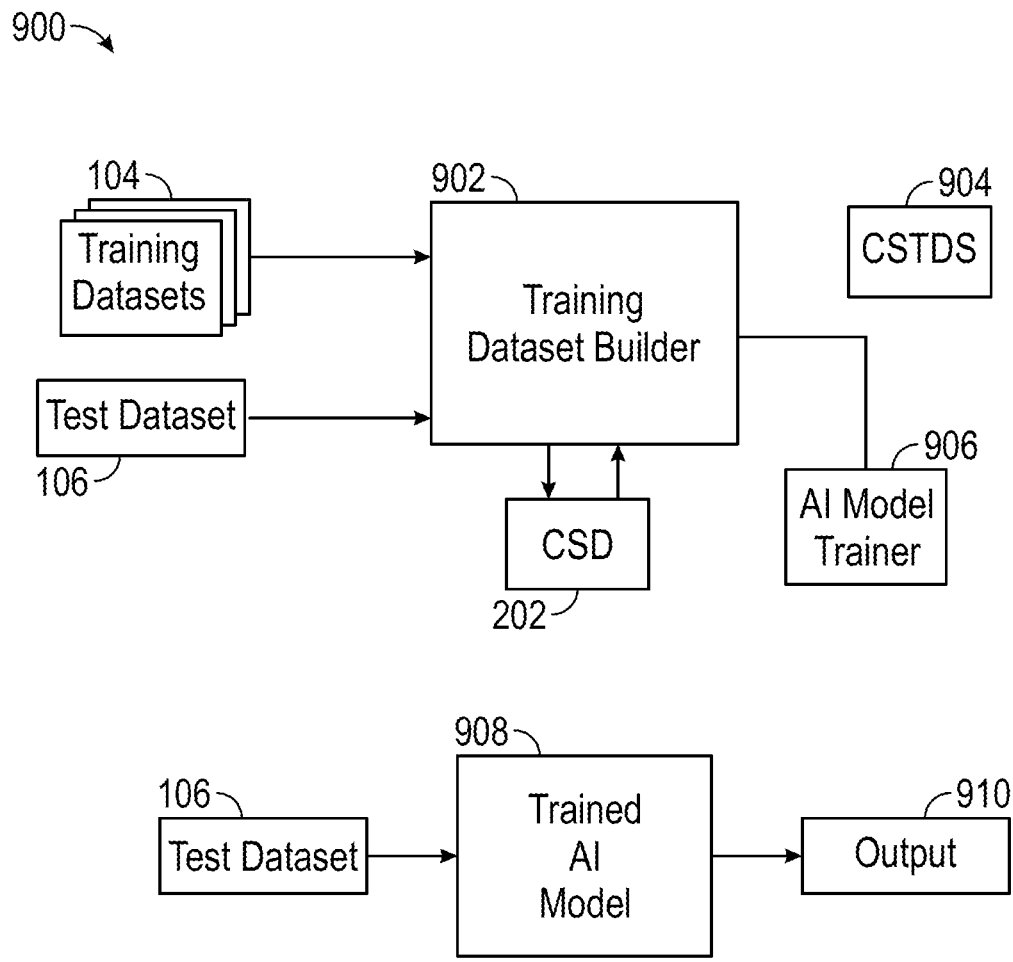
FIG. 9 illustrates a diagram of utilizing the embodiment of FIG. 2 in an environment of developing an artificial intelligence model.

FIG. 9 illustrates a diagram 900 of utilizing the CSD 202 in an environment of developing an artificial intelligence (AI) model. The training dataset builder 902 can receive a plurality of training datasets 104 from a plurality of data sources. The training dataset builder 902 also receives a test dataset 106 for the purpose of testing and evaluating the AI model once the AI model is trained. The training dataset builder 902 can build various combinations of the training datasets 104 and provide the combinations to the CSD 202, along with the test dataset 106. Some combinations may include unchanged training datasets 104. The CSD 202 can determine the context similarity of each combination of the training datasets 104 to the test dataset 106 by providing CSS for each comparison. The training dataset combinations having a high CSS can be identified in this manner and labeled as context-similar training dataset (CSTDS) 904. The CSTDS 904 can be provided to an AI model trainer 906, which uses the same to train an AI model and to generate a trained AI model 908. Subsequently, the test dataset 106 can be used to evaluate the trained AI model 908 by analyzing its output 910. The trained AI model 908 can have a variety of applications in numerous technological fields, including for example, detecting speech in an audio signal, detecting noise in an audio signal, detecting objects in an image, and many other applications.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 10:
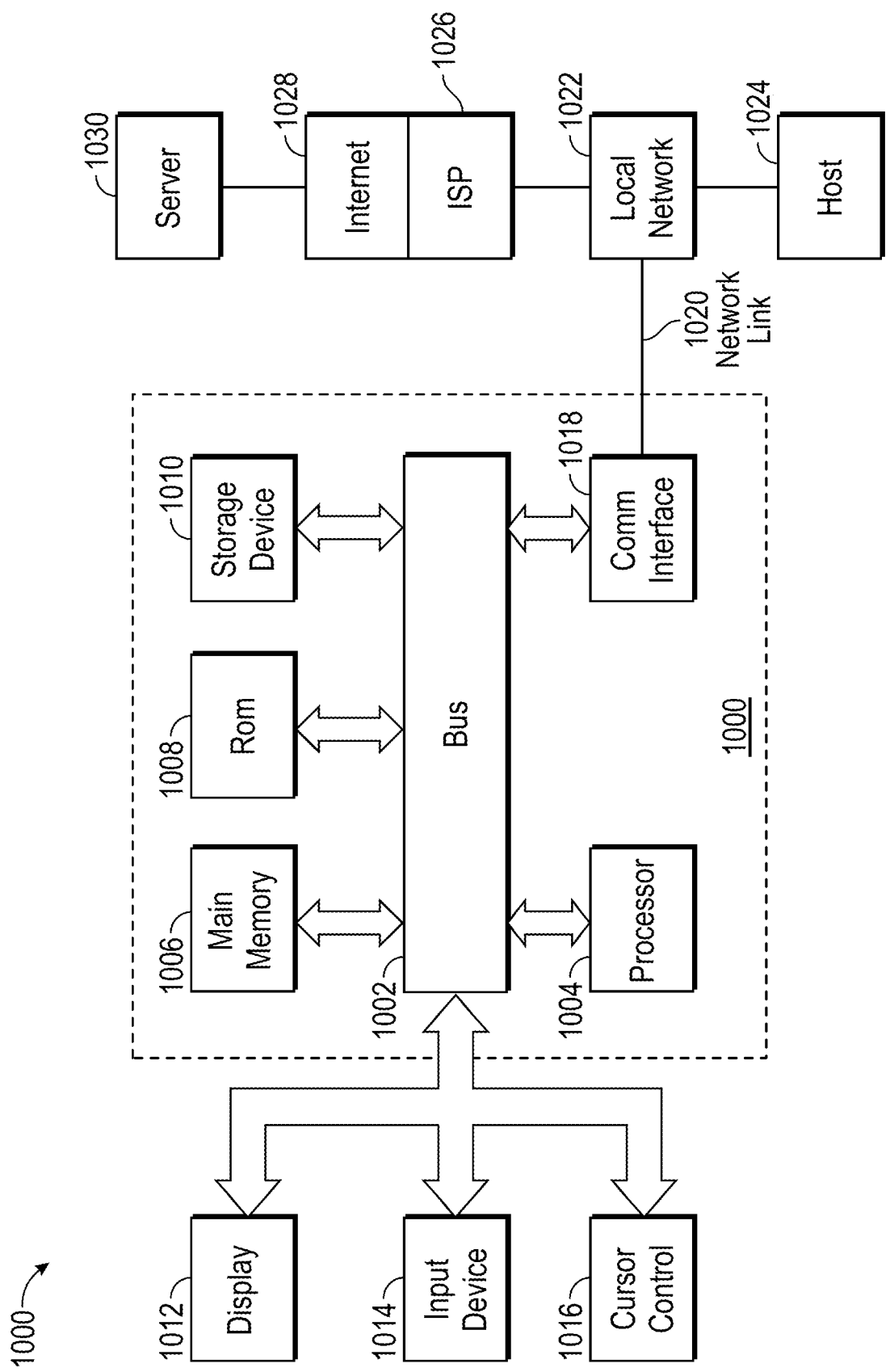
FIG. 10 is a block diagram that illustrates a computer system upon which one or more described embodiment can be implemented.

For example, FIG. 10 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

Examples

It will be appreciated that the present disclosure may include any one and up to all of the following examples.

Example 1: A method comprising: receiving one or more training datasets of an artificial intelligence model from a plurality of data sources; receiving a test dataset of the artificial intelligence model; combining the training datasets and the test dataset; performing clustering on the combined datasets; generating a context similarity score, based on distribution of samples of each dataset in each cluster, wherein the context similarity score indicates similarity of a distribution of the samples in a dataset to distribution of the samples in the test dataset; and identifying one or more training datasets having a context similarity score above a threshold.

Example 2: The method of Example 1 further comprising training the artificial intelligence model based on the identified one or more training datasets having a context similarity score above the threshold.

Example 3: The method of some or all of Examples 1 and 2, further comprising generating a feature vector from the datasets, wherein the clustering on the combined datasets is performed in the feature space defined by the feature vector.

Example 4: The method of some or all of Examples 1-3, wherein generating the context similarity score further comprises: generating a source score for each dataset based on product of weighted normalized occupancies of each cluster by the dataset corresponding to the source.

Example 5: The method of some or all of Examples 1-4, wherein generating the context similarity score further comprises: generating a source score for each dataset based on product of weighted normalized occupancies of each cluster by the dataset corresponding to the source, wherein occupancy comprises a distribution ratio of samples of a dataset in a cluster, normalization comprises dividing the distribution ratios by a number of samples in the dataset, and weighting comprises raising the normalized occupancies to a power of a ratio of size of a cluster relative to other clusters.

Example 6: The method of some or all of Examples 1-5, wherein generating the context similarity score further comprises: generating a source score for each dataset based on product of weighted normalized occupancies of each cluster by the dataset corresponding to the source, wherein the method further comprises: generating a cluster matrix, wherein a matrix cell Mij comprises number of samples of dataset "i" in cluster "j"; generating a normalized cluster matrix by dividing each cell Mij by number of samples in source "i", wherein after normalizing, each cell comprises normalized_Mij; generating a normalized number of samples in each cluster "j", normalized_Cj, by summing column values of the normalized cluster matrix corresponding to cluster "j"; generating a normalized occupancy of a cluster "j" by a source "i" by dividing each cell normalized_Mij of the normalized cluster matrix by the normalized number of samples in each cluster "j"; generating a normalized number of samples in all clusters normalized_Ctotal by summing normalized number of samples in each cluster "j"; weighting the normalized occupancies by raising each normalized occupancy to a power of a ratio of normalized_Cj/normalized_Ctotal; and multiplying the weighted normalized occupancies.

Example 7: The method of some or all of Examples 1-6, wherein generating the context similarity score further comprises, generating a source score for each dataset based on product of weighted normalized occupancies of each cluster by the dataset corresponding to the source, wherein occupancy comprises a distribution ratio of samples of a dataset in a cluster, wherein normalization comprises dividing the distribution ratios by a number of samples in the dataset, wherein weighting comprises raising the normalized occupancies to a power of a ratio of size of a cluster relative to other clusters, and generating a product of the source scores; raising the product to the power of one over number of data sources; and multiplying the raised product by the number of data sources.

Example 8: A non-transitory computer storage that stores executable program instructions that, when executed by one or more computing devices, configure the one or more computing devices to perform operations comprising: receiving one or more training datasets of an artificial intelligence model from a plurality of data sources; receiving a test dataset of the artificial intelligence model; combining the training datasets and the test dataset; performing clustering on the combined datasets; generating a context similarity score, based on distribution of samples of each dataset in each cluster, wherein the context similarity score indicates similarity of a distribution of the samples in a dataset to distribution of the samples in the test dataset; and identifying one or more training datasets having a context similarity score above a threshold.

Example 9: The non-transitory computer storage of Example 8, wherein the operations further comprise training the artificial intelligence model based on the identified one or more training datasets having a context similarity score above the threshold.

Example 10: The non-transitory computer storage of some or all of Examples 8 and 9, wherein the operations further comprise generating a feature vector from the datasets, wherein the clustering on the combined datasets is performed in the feature space defined by the feature vector.

Example 11: The non-transitory computer storage of some or all of Examples 8-10, wherein generating the context similarity score further comprises: generating a source score for each dataset based on product of weighted normalized occupancies of each cluster by the dataset corresponding to the source.

Example 12: The non-transitory computer storage of some or all of Examples 8-11, wherein generating the context similarity score further comprises: generating a source score for each dataset based on product of weighted normalized occupancies of each cluster by the dataset corresponding to the source, wherein occupancy comprises a distribution ratio of samples of a dataset in a cluster, normalization comprises dividing the distribution ratios by a number of samples in the training dataset, and weighting comprises raising the normalized occupancies to a power of a ratio of size of a cluster relative to other clusters.

Example 13: The non-transitory computer storage of some or all of Examples 8-12, wherein generating the context similarity score further comprises: generating a source score for each dataset based on product of weighted normalized occupancies of each cluster by the dataset corresponding to the source, wherein the method further comprises: generating a cluster matrix, wherein a matrix cell Mij comprises number of samples of dataset "i" in cluster "j"; generating a normalized cluster matrix by dividing each cell Mij by number of samples in source "i", wherein after normalizing, each cell comprises normalized_Mij; generating a normalized number of samples in each cluster "j", normalized_Cj, by summing column values of the normalized cluster matrix corresponding to cluster "j"; generating a normalized occupancy of a cluster "j" by a source "i" by dividing each cell normalized_Mij of the normalized cluster matrix by the normalized number of samples in each cluster "j"; generating a normalized number of samples in all clusters normalized_Ctotal by summing normalized number of samples in each cluster "j"; weighting the normalized occupancies by raising each normalized occupancy to a power of a ratio of normalized_Cj/normalized_Ctotal; and multiplying the weighted normalized occupancies.

Example 14: The non-transitory computer storage of some or all of Examples 8-13, wherein generating the context similarity score further comprises, generating a source score for each dataset based on product of weighted normalized occupancies of each cluster by the dataset corresponding to the source, wherein occupancy comprises a distribution ratio of samples of a dataset in a cluster, wherein normalization comprises dividing the distribution ratios by a number of samples in the dataset, wherein weighting comprises raising the normalized occupancies to a power of a ratio of size of a cluster relative to other clusters, and generating a product of the source scores; raising the product to the power of one over number of data sources; and multiplying the raised product by the number of data sources.

Example 15: A system comprising: a training dataset generator configured to perform operations comprising: generating one or more training datasets of an artificial intelligence model from a plurality of data sources; and a context similarity detector configured to perform operations comprising: receiving a test dataset of the artificial intelligence model; combining the training datasets and the test dataset; performing clustering on the combined datasets using a clustering module; generating a context similarity score, based on distribution of samples of each dataset in each cluster, wherein the context similarity score indicates similarity of a distribution of the samples in a dataset to distribution of the samples in the test dataset; and identifying one or more training datasets having a context similarity score above a threshold.

Example 16: The system of Example 15 further comprising an artificial intelligence training module, configured to perform operations comprising: training the artificial intelligence model based on the identified one or more training datasets having a context similarity score above the threshold.

Example 17: The system of some or all of Examples 15 and 16, further comprising a feature generator module configured to perform operations comprising: generating a feature vector from the datasets, wherein the clustering on the combined datasets is performed in the feature space defined by the feature vector.

Example 18: The system of some or all of Examples 15-17, further comprising a source score generator, wherein generating the context similarity score further comprises the source score generator generating a source score for each dataset based on product of weighted normalized occupancies of each cluster by the dataset corresponding to the source, wherein occupancies are generated with a distribution module, normalization is performed by a normalizer module and weighting is performed with a weighting module.

Example 19: The system of some or all of Examples 15-18, wherein generating the context similarity score further comprises: a source score generator generating a source score for each dataset based on product of weighted normalized occupancies of each cluster by the dataset corresponding to the source, wherein occupancy is generated with a distribution module and comprises a distribution ratio of samples of a dataset in a cluster, normalization is performed by a normalizer module and comprises dividing the distribution ratios by a number of samples in the dataset, and weighting is performed by a weighting module and comprises raising the normalized occupancies to a power of a ratio of size of a cluster relative to other clusters.

Example 20: The system of some or all of Examples 15-19, wherein generating the context similarity score further comprises: a source score generator generating a source score for each dataset based on product of weighted normalized occupancies of each cluster by the dataset corresponding to the source, wherein the system further comprises: a cluster matrix generator generating a cluster matrix, wherein a matrix cell $M_{ij}$ comprises number of samples of dataset "i" in cluster "j"; a normalizer module generating a normalized cluster matrix by dividing each cell $M_{ij}$ by number of samples in source "i", wherein after normalizing, each cell comprises normalized_$M_{ij}$; the normalizer module generating a normalized number of samples in each cluster "j", normalized_$C_j$, by summing column values of the normalized cluster matrix corresponding to cluster "j"; the source score generator, generating a normalized occupancy of a cluster "j" by a source "i", by dividing each cell normalized_$M_{ij}$ of the normalized cluster matrix by the normalized number of samples in each cluster "j"; the normalizer module generating a normalized number of samples in all clusters normalized_$C_{total}$ by summing normalized number of samples in each cluster "j"; a weighting module, weighting the normalized occupancies by raising each normalized occupancy to a power of a ratio of normalized_$C_j$/normalized_$C_{total}$; and the source score generator, generating the source score by multiplying the weighted normalized occupancies.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method comprising:
receiving, by a context similarity detector, one or more training datasets of an artificial intelligence model from a plurality of data sources;
receiving, by the context similarity detector, a test dataset of the artificial intelligence model;
combining, by the context similarity detector, the one or more training datasets and the test dataset into combined datasets;
performing, by the context similarity detector, clustering on the combined datasets;
generating, by the context similarity detector, a context similarity score based on a distribution of samples of each dataset in each cluster, wherein the context similarity score indicates similarity of a distribution of the samples in a dataset to a distribution of the samples in the test dataset; and
identifying, by the context similarity detector, one or more training datasets having a context similarity score above a threshold.

2. The method of claim 1, further comprising:
training the artificial intelligence model based on the one or more training datasets having a context similarity score above the threshold.

3. The method of claim 1, further comprising:
generating, by the context similarity detector, a feature vector from the combined datasets, wherein the clustering on the combined datasets is performed in a feature space defined by the feature vector.

4. The method of claim 1, wherein generating the context similarity score comprises:
generating a source score for each dataset based on product of weighted normalized occupancies of each cluster by the dataset corresponding to the source.

5. The method of claim 1, wherein generating the context similarity score comprises:
generating a source score for each dataset based on product of weighted normalized occupancies of each cluster by the dataset corresponding to the source, wherein occupancy comprises a distribution ratio of samples of a dataset in a cluster,
normalization comprises dividing the distribution ratios by a number of samples in the dataset, and
weighting comprises raising the normalized occupancies to a power of a ratio of size of a cluster relative to other clusters.

6. The method of claim 1, wherein generating the context similarity score comprises:
generating a source score for each dataset based on product of weighted normalized occupancies of each cluster by the dataset corresponding to the source, wherein the method further comprises:
generating a cluster matrix, wherein a matrix cell Mij comprises number of samples of dataset "i" in cluster "j";
generating a normalized cluster matrix by dividing each cell Mij by number of samples in source "i", wherein after normalizing, each cell comprises normalized_Mij;
generating a normalized number of samples in each cluster "j", normalized_Cj, by summing column values of the normalized cluster matrix corresponding to cluster "j";
generating a normalized occupancy of a cluster "j" by a source "i" by dividing each cell normalized_Mij of the normalized cluster matrix by the normalized number of samples in each cluster "j";
generating a normalized number of samples in all clusters normalized_Ctotal by summing normalized number of samples in each cluster "j";
weighting the normalized occupancies by raising each normalized occupancy to a power of a ratio of normalized_Cj/normalized_Ctotal; and
multiplying the weighted normalized occupancies.

7. The method of claim 1, wherein generating the context similarity score, comprises:
generating a source score for each dataset based on product of weighted normalized occupancies of each cluster by the dataset corresponding to the source, wherein occupancy comprises a distribution ratio of samples of a dataset in a cluster,
wherein normalization comprises dividing the distribution ratios by a number of samples in the dataset,
wherein weighting comprises raising the normalized occupancies to a power of a ratio of size of a cluster relative to other clusters, and
generating a product of the source scores;
raising the product to the power of one over number of data sources; and
multiplying the raised product by the number of data sources.

8. A non-transitory computer storage that stores executable program instructions that, when executed by one or more computing devices, configure the one or more computing devices to perform operations comprising:
receiving, by a context similarity detector, one or more training datasets of an artificial intelligence model from a plurality of data sources;
receiving, by the context similarity detector, a test dataset of the artificial intelligence model;
combining, by the context similarity detector, the one or more training datasets and the test dataset into combined datasets;
performing, by the context similarity detector, clustering on the combined datasets;
generating, by the context similarity detector, a context similarity score based on a distribution of samples of each dataset in each cluster, wherein the context similarity score indicates similarity of a distribution of the samples in a dataset to a distribution of the samples in the test dataset; and
identifying, by the context similarity detector, one or more training datasets having a context similarity score above a threshold.

9. The non-transitory computer storage of claim 8, wherein the operations further comprise:
training the artificial intelligence model based on the one or more training datasets having a context similarity score above the threshold.

10. The non-transitory computer storage of claim 8, wherein the operations further comprise:
generating, by the context similarity detector, a feature vector from the combined datasets, wherein the clustering on the combined datasets is performed in a feature space defined by the feature vector.

11. The non-transitory computer storage of claim 8, wherein generating the context similarity score comprises:
generating a source score for each dataset based on product of weighted normalized occupancies of each cluster by the dataset corresponding to the source.

12. The non-transitory computer storage of claim 8, wherein generating the context similarity score comprises:

generating a source score for each dataset based on product of weighted normalized occupancies of each cluster by the dataset corresponding to the source, wherein occupancy comprises a distribution ratio of samples of a dataset in a cluster,
  normalization comprises dividing the distribution ratios by a number of samples in the training dataset, and
  weighting comprises raising the normalized occupancies to a power of a ratio of size of a cluster relative to other clusters.

13. The non-transitory computer storage of claim 8, wherein generating the context similarity score comprises:
  generating a source score for each dataset based on product of weighted normalized occupancies of each cluster by the dataset corresponding to the source, wherein the operations further comprise:
    generating a cluster matrix, wherein a matrix cell Mij comprises number of samples of dataset "i" in cluster "j";
    generating a normalized cluster matrix by dividing each cell Mij by number of samples in source "i", wherein after normalizing, each cell comprises normalized_Mij;
    generating a normalized number of samples in each cluster "j", normalized_Cj, by summing column values of the normalized cluster matrix corresponding to cluster "j";
    generating a normalized occupancy of a cluster "j" by a source "i" by dividing each cell normalized_Mij of the normalized cluster matrix by the normalized number of samples in each cluster "j";
    generating a normalized number of samples in all clusters normalized_Ctotal by summing normalized number of samples in each cluster "j";
    weighting the normalized occupancies by raising each normalized occupancy to a power of a ratio of normalized_Cj/normalized_Ctotal; and
    multiplying the weighted normalized occupancies.

14. The non-transitory computer storage of claim 8, wherein generating the context similarity score comprises:
  generating a source score for each dataset based on product of weighted normalized occupancies of each cluster by the dataset corresponding to the source, wherein occupancy comprises a distribution ratio of samples of a dataset in a cluster,
    wherein normalization comprises dividing the distribution ratios by a number of samples in the dataset,
    wherein weighting comprises raising the normalized occupancies to a power of a ratio of size of a cluster relative to other clusters, and
  generating a product of the source scores;
  raising the product to the power of one over number of data sources; and
  multiplying the raised product by the number of data sources.

15. A system comprising:
  a training dataset generator configured to perform operations comprising:
    generating one or more training datasets of an artificial intelligence model from a plurality of data sources; and
  a context similarity detector configured to perform operations comprising:
    receiving a test dataset of the artificial intelligence model;
    combining the one or more training datasets and the test dataset into combined datasets;
    performing clustering on the combined datasets using a clustering module;
    generating a context similarity score based on a distribution of samples of each dataset in each cluster, wherein the context similarity score indicates similarity of a distribution of the samples in a dataset to a distribution of the samples in the test dataset; and
    identifying one or more training datasets having a context similarity score above a threshold.

16. The system of claim 15, further comprising:
  an artificial intelligence training module configured to perform operations comprising:
    training the artificial intelligence model based on the one or more training datasets having a context similarity score above the threshold.

17. The system of claim 15, further comprising:
  a feature generator module configured to perform operations comprising:
    generating a feature vector from the combined datasets, wherein the clustering on the combined datasets is performed in a feature space defined by the feature vector.

18. The system of claim 15, further comprising:
  a source score generator, wherein generating the context similarity score comprises the source score generator generating a source score for each dataset based on product of weighted normalized occupancies of each cluster by the dataset corresponding to the source, wherein occupancies are generated with a distribution module, normalization is performed by a normalizer module, and weighting is performed with a weighting module.

19. The system of claim 15, wherein generating the context similarity score comprises:
  a source score generator generating a source score for each dataset based on product of weighted normalized occupancies of each cluster by the dataset corresponding to the source, wherein occupancy is generated with a distribution module and comprises a distribution ratio of samples of a dataset in a cluster,
    normalization is performed by a normalizer module and comprises dividing the distribution ratios by a number of samples in the dataset, and
    weighting is performed by a weighting module and comprises raising the normalized occupancies to a power of a ratio of size of a cluster relative to other clusters.

20. The system of claim 15, wherein generating the context similarity score comprises:
  a source score generator generating a source score for each dataset based on product of weighted normalized occupancies of each cluster by the dataset corresponding to the source, wherein the system further comprises:
    a cluster matrix generator generating a cluster matrix, wherein a matrix cell Mij comprises number of samples of dataset "i" in cluster "j";
    a normalizer module generating a normalized cluster matrix by dividing each cell Mij by number of samples in source "i", wherein after normalizing, each cell comprises normalized_Mij;
    the normalizer module generating a normalized number of samples in each cluster "j", normalized_Cj, by summing column values of the normalized cluster matrix corresponding to cluster "j";
    the source score generator, generating a normalized occupancy of a cluster "j" by a source "i", by dividing each cell normalized_Mij of the normalized cluster matrix by the normalized number of samples in each cluster "j";

the normalizer module generating a normalized number of samples in all clusters normalized_Ctotal by summing normalized number of samples in each cluster "j";

a weighting module, weighting the normalized occupancies by raising each normalized occupancy to a power of a ratio of normalized_Cj/normalized_Ctotal; and the source score generator, generating the source score by multiplying the weighted normalized occupancies.

* * * * *